Patented May 16, 1933

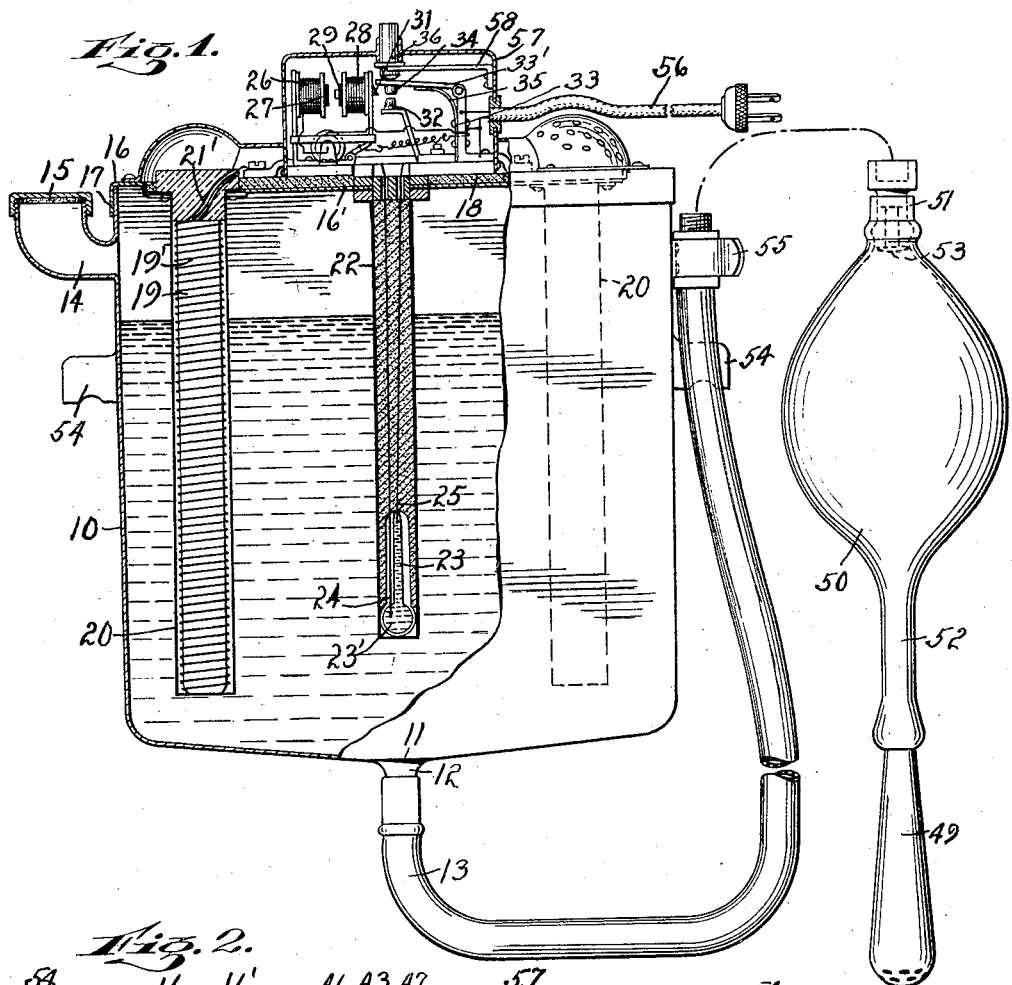

1,909,464

UNITED STATES PATENT OFFICE

PHILIPP GUMSHEIMER, OF ELIZABETH, NEW JERSEY

FLUSHING DEVICE

Application filed December 15, 1931. Serial No. 581,103.

The present invention relates to a reservoir and automatic heating device for domestic and medical flushing purposes.

In the home and in hospitals, flushes, syringes, douches and the like with warm liquid are frequently necessary. Water tapped from the house hot water mains may be objectionable on the grounds of impurity. In such instance it is necessary to first heat the purer water and then transfer it to the reservoir for the syringing or injecting purposes. Time is thus wasted. Inaccuracy of temperature control also results. Further, no temperature control over the water obtainable from the hot water mains is usually available, so that the difficulty of obtaining liquid of the right temperature remains even though use of it directly from said mains is made.

One object of my invention therefore is to provide a device which will eliminate the aforementioned drawbacks and provide effective means for securing directly in the reservoir for the syringe or douche, liquid of the desired temperature.

Such a device to be practical, must be simple in construction and economical both from the standpoint of production and consumption. It, therefore, is another object of my invention to produce such a practical device. With the above and other objects in view, my invention comprises the novel construction, combination and arrangement of elements to be hereinafter more fully described, shown and defined in the appended claims.

In the accompanying drawing, which forms part of this specification and in which similar reference characters denote corresponding parts:—

Fig. 1 is an elevational view, partially in section of my device;

Fig. 2 is a plan view also partially in section of said device; and

Fig. 3 is a diagrammatic showing of the electrical circuit employed.

Referring to the drawing, 10 denotes a reservoir which may be of metal or any other suitable material which has an outlet 11 at its bottom to which a nozzle 12 may be attached and on which latter a hose 13 of rubber or the like may be fastened for a purpose to be presently described.

Near its upper end, said reservoir is provided with an inlet nozzle 14 having a removable closure member 15 which threadedly or in other suitable manner engages said nozzle.

A cover 16 is provided for the reservoir which has a rim 17 which latter frictionally or otherwise engages the walls of said reservoir to retain the lid in place.

The said lid may be provided with a depression $16^1$ in which a plate 18 of asbestos, fibre or any other suitable insulating material is mounted.

The heating means for liquid in said reservoir may be constructed as follows:—

Projecting downwardly through the said plate and lid are rods 19 of porcelain or other heat resisting insulative material which have mounted about them in well known manner, coils $19^1$ of electrical resistance wire of known composition which serve as heating units in a manner to be presently described. Suitable enclosing casings 20 of German silver, chrome nickel, or other non-corrodible material are mounted about said rods 19 without contacting with said resistance coils. Said casings may be suitably supported from the under side of cover 16. The coil ends are led upwardly respectively through the upper end of the rods 19 in suitable grooves 21 and $21^1$.

Also suspended from the cover 16 preferably between the two heating units, is a tubular casing 22. Mounted interiorly of said casing 21 at its bottom is a thermostatic device comprising a thermometer tube 23 having the usual mercury reservoir $23^1$ at its bottom. Sealed in the walls of and extending into said mercury reservoir is a lead wire 24. Likewise, sealed and extending into the thermometer tube 23 near or at its upper end is a second lead wire 25. The two wires 24 and 25 are led upwardly through casing 22 and out through its upper end. To properly insulate the two wires from each other, casing 22 may be filled with insulating packing of any desired material.

Suitably supported on said cover 16 in fixed relationship thereto is a solenoid 26 having a magnetic core 27.

Pivotally supported on said cover is a second solenoid 28 having a magnetic core 29, which is adapted to lie opposite core 27 so that when the two solenoids are energized by flow of electric current therethrough the pivotally supported one will be drawn toward the stationary support. Suitable means as a spring 30 serves to urge the movable core away from the stationary one.

Attached to the movable core is a nose 31 for a purpose to be hereinafter specified.

Fixedly and insulatively supported on cover 16 is a contact point 32 which may be of iridium, platinum or other non-corrodible material. Pivotally supported from a suitable member 33, which latter is also insulatively mounted on cover 16, on an arm $33^1$ is a second contact 34 which is of the same material as stationary contact 32. Spring means 35 serves to urge contacts 32 and 34 apart by pushing the latter away from the former.

The free end of member $33^1$ is adapted when solenoids 26 and 28 are deenergized to be engageable by nose 31 so that when contact 34 is pushed into engagement with contact 32 by means of a suitable push button 36, said end will be so engaged by said nose 31 and maintain the engagement between the two contacts until release of end $33^1$ from under nose 31 is effected.

The electrical connections are as follows:—

Heating coils 19' are connected in electrical series connection by wire 37. The two free ends of the coils are respectively connected to one of the input terminals 38 by wire 39 and to stationary contact 32 by wire 40. Movable contact 34 is connected by wire 41 to the other input terminal 42. The circuit described is a simple series circuit which is closed by bringing contact 34 into engagement with contact 32. If desired, parallel connection of coils $19^1$ could be employed.

The control or release circuit comprises the thermometer 23 and solenoids 26 and 28. The latter are connected in electrical series connection by wire 43. The free end of coil 28 is connected by wire 44 to wire 40. The free end of coil 26 is connected by wire 45 to a current limiting device such as a resistance coil 46. The free terminal of the latter is connected by wire 47 to lead wire 24 of the mercury reservoir $23^1$. Lead wire 25 of thermometer 23 is connected to wire 39 which leads to terminal 38. Thus whenever the mercury in reservoir $23^1$ rises to contact with the inner end of lead wire 25, the circuit through solenoids 26 and 28 is closed resulting in attraction of core 29 to core 27 and consequent release by nose 31 of the free end of arm $33^1$ consequently breaking of the heater circuit and simultaneously breaking the release circuit.

Any kind of syringe or douche nozzle may be attached to the hose 13.

In the present embodiment I show a device which may be mounted between the end of said hose and a nozzle 49 of any known type for the purpose of increasing the force of the stream emerging from said nozzle. This is desirable where it is not practically possible to suspend the reservoir 10 from a sufficiently high elevation. Said device comprises a hollow bulb 50 of resilient material such as rubber or the like having a restricted inlet 51 and a restricted outlet 52 in or on which latter said nozzle or syringe may be mounted. Provided at the inlet is a one-way valve 53 which serves to permit liquid to flow from the hose into the bulb but prevents flow in the opposite direction. Said valve is of any well known constructions. With liquid present in said bulb, pressure exerted thereon will cause its ejection through nozzle 49. In this manner gravity activation of the liquid flow from the reservoir can be augmented.

To facilitate suspension of the device reservoir 10 may be provided externally with projections 54 which may be hung over projecting pins (not shown) on a wall or the like (not shown). Any other suspending means may be provided.

A spring clamp 55 or the like, on the exterior of the reservoir may be provided for suspending the hose when the latter is not in use.

A lead-in cord 56 may be provided to connect terminals 38 and 42 to an electric power source.

The device is employed as follows:—

Reservoir 10 is filled with the desired liquid through opening 14 and push button 36 depressed to close the heating circuit as described. When the liquid reaches the proper temperature the mercury in the thermometer 23 will have risen to desired height to close the release circuit whereupon the heating circuit will be opened by release of engagement between contacts 32 and 34.

The heated liquid is then used for injecting or syringing purposes as required.

The release circuit is broken simultaneously with the heating circuit for the complete circuit through the solenoids is completed through contacts 32 and 34.

An overall cover 57 for the mechanism mounted on cover 16 may be provided and may be fastened to the latter in any suitable manner.

Spring 58 attached to cover 57 normally urges push button 36 upwardly.

My device may be modified in many ways without departing from the spirit of my invention and I do not wish to be limited to the details shown and described.

What I claim is:—

1. In a liquid flushing device having a reservoir for liquid and electric heating means therefor, thermostatic means suspended in said reservoir, a stationary and movable contact which when in engagement serve to close an electric circuit through said heating means, means for urging separated relationship between said contacts, engaging means for maintaining engagement between said contacts in opposition to said urging means, a stationary electro-magnet, a movable electro-magnet on which said engaging means is mounted, said two electro-magnets being electrically connected with said thermostatic means whereby said magnets are actuated when said liquid attains the desired temperature, thereby causing said engaging means to release said movable contact and break the engagement between said two contacts.

2. In a liquid flushing device having a reservoir for liquid and an electric heater, a thermostat suspended in said reservoir, an electric switch comprising a stationary contact and a movable contact connected in electrical series with said heater, said contacts when engaged with each other serving to close the electric circuit through said heater from a power source, means for urging separated relationship between said contacts, a stationary electro-magnet, a movable electro-magnet supported adjacent said stationary electro-magnet and adapted to be attracted to the latter when both magnets are energized, means for urging said magnets apart while deenergized, an engaging means mounted on said movable electro-magnet serving when said magnets are deenergized to engage said movable contact member and retain the latter in electrical contact with said stationary contact counter to the action of said means for urging separated relationship therebetween, said two electro-magnets being electrically connected through said thermostatic means with said electric power source, whereby they are energized when the liquid in said container attains a desired temperature as determined by said thermostat thereby causing said engaging means to release said movable contact and thus break the electric circuit through said heater.

In testimony whereof, I affix my signature.

PHILIPP GUMSHEIMER.